United States Patent
Hampapur et al.

(10) Patent No.: US 7,991,193 B2
(45) Date of Patent: Aug. 2, 2011

(54) AUTOMATED LEARNING FOR PEOPLE COUNTING SYSTEMS

(75) Inventors: Arun Hampapur, Norwalk, CT (US); Ying-li Tian, Yorktown Heights, NY (US); Yun Zhai, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 1036 days.

(21) Appl. No.: 11/830,386

(22) Filed: Jul. 30, 2007

(65) Prior Publication Data
US 2010/0027875 A1   Feb. 4, 2010

(51) Int. Cl.
*G06K 9/00* (2006.01)
*G06K 9/62* (2006.01)

(52) U.S. Cl. .................... 382/103; 382/159
(58) Field of Classification Search ........... 382/192, 382/159, 103; 348/143–147, 150–155
See application file for complete search history.

(56) References Cited

U.S. PATENT DOCUMENTS

| | | | |
|---|---|---|---|
| 5,656,801 A | 8/1997 | Goren et al. | |
| 7,161,482 B2 | 1/2007 | Rider et al. | |
| 7,203,338 B2 | 4/2007 | Ramaswamy et al. | |
| 2006/0171570 A1 | 8/2006 | Brendley et al. | |
| 2006/0227862 A1* | 10/2006 | Campbell et al. | 375/240 |
| 2006/0269103 A1* | 11/2006 | Brown et al. | 382/103 |
| 2007/0086623 A1 | 4/2007 | Ramaswamy et al. | |
| 2008/0212099 A1* | 9/2008 | Chen | 356/408 |

OTHER PUBLICATIONS

Park et al., "Development of a block-based real-time people counting system", Aug. 2006, SSPR&SPR 2006, LNCS 4109, pp. 366-374.*
Adriano et al., "APeC: Automated People Counting from Video", in Proc. Conf. Security and Networking, Philippine, 2005.*
Hsieh et al., "Grid-based Template Matching for People Counting", Multimedia Signal Processing, Oct. 2007.*

* cited by examiner

*Primary Examiner* — Vu Le
*Assistant Examiner* — Soo Jin Park
(74) *Attorney, Agent, or Firm* — Anna L. Linne; Hoffman Warnick LLC (57) ABSTRACT

A system, method and program product for providing automated learning for a people counting system. A system is disclosed that includes a grid system for dividing a field of view (FOV) of a captured image data into a set of blocks; an object detection and tracking system for tracking a blob passing through the FOV; and a learning system that maintains person size parameters for each block and updates person size parameters for a selected block when a blob appears in the selected block.

22 Claims, 7 Drawing Sheets

AUTOMATED LEARNING FOR PEOPLE COUNTING SYSTEMS

FIELD OF INVENTION

The present invention relates to the field of video surveillance systems. More particularly, the present invention relates to automatic learning of person size information in a people counting system using spatial location awareness and parameter propagation techniques.

BACKGROUND OF INVENTION

The ability to automatically count people passing through a given area using video surveillance has many applications. In a typical application, a video camera is placed above an area and people passing through a field of view (FOV) are counted using a technique that is capable of identifying people. For instance, a moving object that meets some size range can be identified as a person.

Accordingly, the selection of the size range in a camera FOV is a critical process in any people counting system that is based on object detection and tracking techniques. This selection directly affects the accuracy of the counting results and is particularly important when multiple people are walking closely to each other in a group. In a group case, the counting system must know accurate person size information to deduce the number of people in the group.

Due to various reasons, single persons often appear with different sizes in the same camera FOV. One of these reasons is the different anthropometric characteristics of human bodies. These characteristics include, e.g., human height, stretch, weight, bust, etc., and determine the shape of each person. In addition, these characteristics cause different sizes of human shadows to be generated when a light source is present in the scene. Another significant cause of different human sizes in camera FOV is the perspective projection effects of the camera. If the camera is at the infinite distance from the monitoring scene, the perspective effects can be ignored. However, this is the ideal case and not realistic in any of the real life situations. As demonstrated in FIG. 2, due to the perspective effects of a normal overhead camera 220, persons with the same size in the real scene 230 will have significant difference between their projected blob sizes in the image 210.

A common shortcoming of many current in-market vision-based people counting systems is the use of global person size parameters, either pre-defined or learned from the training samples. They are not able to effectively handle the size variation situations described above. In such systems, overhead cameras are deployed that require very restricted intrinsic and extrinsic settings about the camera and the settings of the monitoring scenes, such that the walking persons are limited to pass through areas that do not have significant camera perspective effects and/or only allow small size groups of people (a single person or two) passing through. However, in many situations, organizations already have their own cameras installed and would like to utilize these cameras to perform counting tasks. Unfortunately, the aforementioned systems are very difficult to be generalized to handle the counting task in these situations, and many times fail to provide accurate counting results due to their inability to determine the appropriate person size information. Accordingly, a need exists for a person counting system that can address these as well as other issues.

SUMMARY OF THE INVENTION

The present invention addresses the above-mentioned problems, as well as others, by providing a system, method and program product that divides the field of view (FOV) of a camera into a grid, and associates a unique size threshold for each block in the grid in order to effectively count persons passing through the FOV. A learning system is provided that maintains and updates person size parameters for each block.

In a first aspect, the invention provides a system for processing captured image data, comprising: a grid system for dividing a field of view (FOV) of the captured image data into a set of blocks; and a learning system that maintains person size parameters for each block and updates person size parameters for a selected block when a blob appears in the selected block.

In a second aspect, the invention provides a program product stored on a computer readable medium for implementing a person counting system, comprising: program code for dividing a field of view (FOV) of captured image data into a set of blocks; and program code for maintaining person size parameters for each block and updating person size parameters for a selected block when a blob appears in the selected block.

In a third aspect, the invention provides a method for implementing a person counting system, comprising: dividing a field of view (FOV) of captured image data into a set of blocks and providing a data structure for maintaining person size parameters for each block; and updating person size parameters for a selected block when a blob appears in the selected block.

In a fourth aspect, the invention provides a method for deploying a system for counting persons from a captured image data, comprising: providing a computer infrastructure being operable to: divide a field of view (FOV) of the captured image data into a set of blocks; maintain person size parameters for each block and update the person size parameters for a selected block when a blob appears in the selected block; count persons passing through the FOV by comparing a blob size appearing in a block with the person size parameters for the block; and output count data.

DETAILED DESCRIPTION OF THE INVENTION

The present invention is designed to facilitate vision-based people counting systems with the ability to automatically learn the person size range information of a new environment where the person counting system is deployed. To handle the size differences caused by the aforementioned factors, the camera field of view (FOV) is divided into a grid of $[n] \times [m]$ blocks with fixed dimensions, and person size information is learned for each individual block of the camera FOV in an independent fashion in the learning process.

Figure 1:
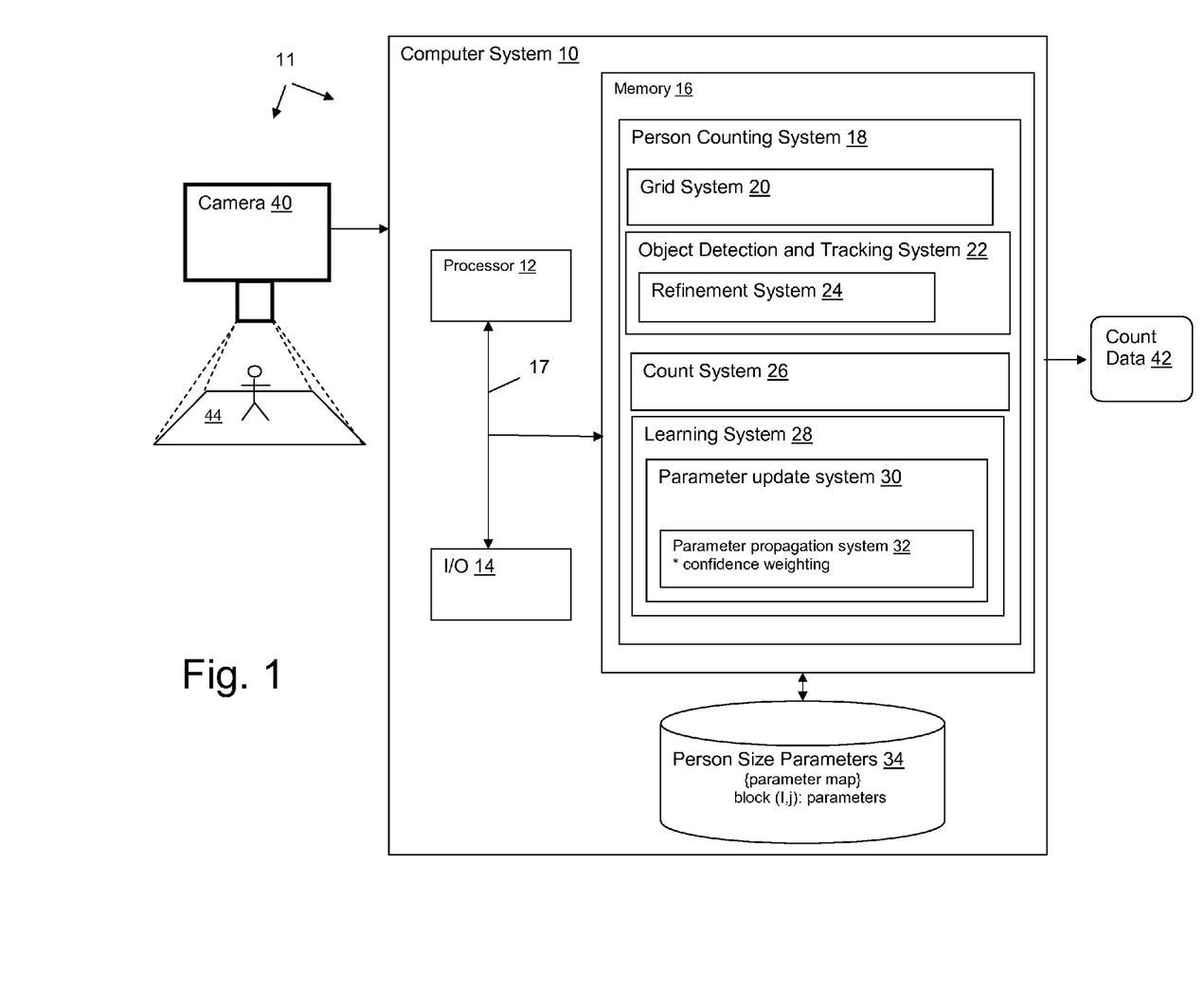
FIG. 1 depicts a computer system having a person counting system in accordance with an embodiment of the invention.

FIG. 1 depicts a surveillance system 11 that includes a camera 40 and computer system 10 having a person counting system 18. In this illustrative embodiment, camera 40 is mounted above a field of vision (FOV) 44 through which people pass. It is however understood that the invention is not limited to any particular camera position. As camera 40 collects video image data, the image data is passed to computer system 10 where it is processed by person counting system 18 to generate count data 42. Person counting system 18 generally includes: (1) a grid system 20 for dividing the FOV 44 into a grid containing a set of blocks; (2) an object detection and tracking system 22 for detecting and tracking moving objects (i.e., blobs) within the video image; (3) a count system 26 that counts people passing through the FOV 44 by determining if a moving object is a person by comparing its size to person size parameters 34; (4) and a learning system 28 that utilizes a parameter update system 30 to maintain and update the person size parameters 34.

Figure 5:
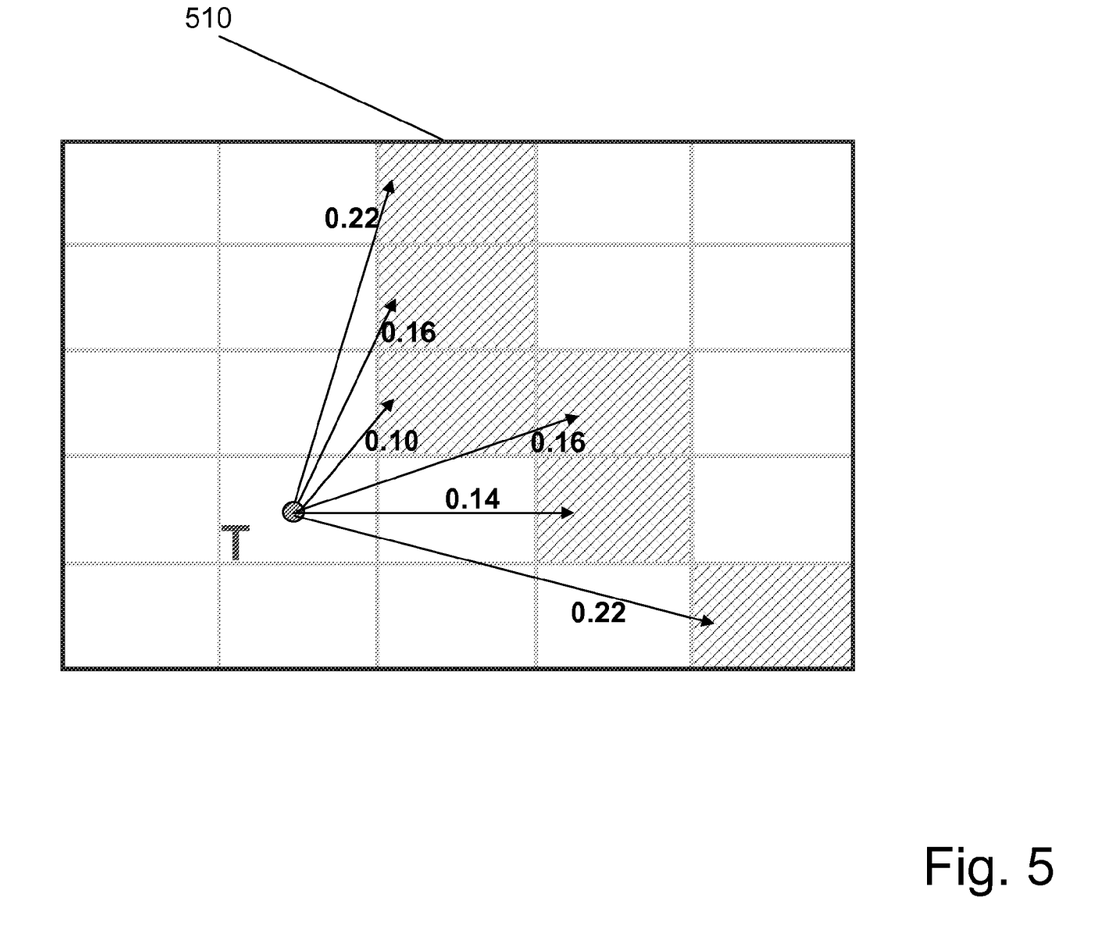
FIG. 5 shows the interpolation of person size parameters of target idle block, T, using active image blocks (the shaded area) in accordance with an embodiment of the invention.

As noted above, the FOV 44 is broken into blocks and each block in the grid has its own set of person size parameters 34. Person size parameters 34 may be maintained in any type of data structure, e.g., a database, a data object, etc. Grid system 20 may utilize any technique for breaking the FOV 44 of camera 40 into a set of blocks. For example, FIG. 5 depicts an illustrative grid 510 for person counting system 18. In some of the embodiments described herein, each image block is denoted as block (i,j), where i represents its row number and j represents the column number. Note that while the resulting blocks are described as rectangular throughout this disclosure, they may be of any shape or size.

As also noted, object detection and tracking system 22 is utilized to detect moving objects and track them throughout the FOV 44. From the object detection and tracking system 22, the projected person capture from the image data forms a motion blob in the FOV 44. Due to noise produced during the video acquisition process, the obtained motion blob of the person often is not perfect and may contain holes inside itself. To compensate for this, a refinement system 24 may be provided in which, for example, ellipses are fitted to the motion blob and an "OR" map is generated by overlaying the original motion blob on the fitting ellipse. Other ways of computing a refined motion blob are also available, such as taking the area of the original projected motion blob with a fitted rectangle, circle, rhombus, etc. The area of the newly refined motion blob may be used by both count system 26 for counting purposes during an operation counting mode and as a new training sample for the learning system 28.

Figure 3:
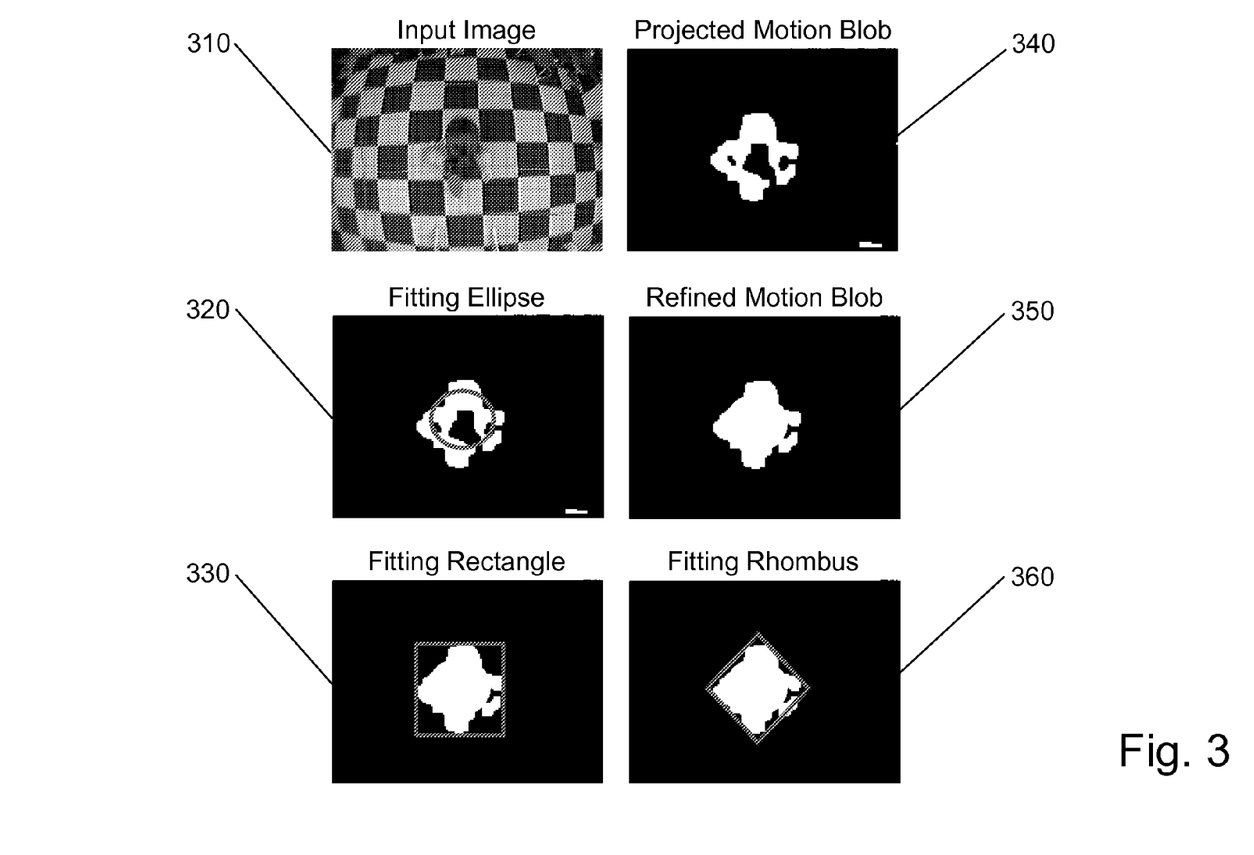
FIG. 3 depicts an illustration of generating a refined motion blob by fitting ellipse in accordance with an embodiment of the invention.

Illustrative results from the refinement system 24 are shown in FIG. 3 with various fitting options. Image 310 depicts an input image 310 and image 340 depicts a projected motion blob. Image 320 shows the projected motion blob with a fitting ellipse and image 350 shows a refined motion blob. Images 330 and 360 show the refined motion blob with a fitting rectangle and a fitting rhombus, respectively.

Once the new blob sample is obtained, the image block to which the blob belongs is determined by mapping the blob's centroid to the grid coordinates. During the operational count mode, count system 26 can compare the area of the blob to person size parameters 34 for the block in which the blob appears. If the blob falls within the person size parameters 34 for the block, then count system 26 recognizes the blob as a person, and it can be counted as such.

Learning system 28 is utilized to establish the person size parameters 34 for each block. Person size parameters 34 may be established in a training mode by collecting blob size data before the surveillance system 11 is placed into an operational counting mode, as well as during the operational counting mode when counting is actually taking place.

The person size parameters 34 may comprise any information obtainable from the motion blob and/or refined motion blob including, e.g., area, the mean and standard deviation of the motion blob sizes, etc. Person size parameters 34 may be updated by parameter update system 30 using all the obtained training samples with equal weights. In the grid, all image blocks may be considered as "useful". Thus, every obtained training sample may be used to update the person size parameters 34 regardless of where it resides in the camera FOV 44. However, a pre-defined filtering process may be applied such that, e.g., only the refined motion blobs that are in an interested target counting region are used for parameter updating.

Training samples are obtained by capturing the area information from each single blob image. They can also be obtained by taking information of each person's trajectory. The first approach monitors the change of the tracked person, but saves redundant information, while the second approach only records the size information of each single person once. A potential issue of this second approach is to decide which sample to select along the person's motion trajectory as the proper training sample.

In one illustrative embodiment, person size parameters 34 utilize a Gaussian (normal) distribution that is applied to model the human sizes in each image block. This choice is based on the anthropometry studies of human body. Each image block's Gaussian distribution is defined by its mean, $\mu$ (the average), and standard deviation, $\sigma$ (the spread of the distribution). The upper bound and lower bound of the person size range are defined as $\mu+3\sigma$ and $\mu-3\sigma$, respectively. When a new training sample (size of person's motion blob) is obtained, it is first passed to a range filter to determine its eligibility for parameter update. The purpose of the range filter is to eliminate the noisy training samples, for example, person sizes that are too small or too big to be realistic. In this illustrative implementation, a new sample, x, is accepted for the parameter update only if the following rule is satisfied:

$$\sqrt{\frac{(x-\mu)^2}{\sigma^2}} \geq Th, \qquad (1)$$

where Th is the predefined threshold. The range filter could be in other forms. One alternative is to use a fixed interval [a, b], such that only samples that are inside this interval will be used for parameter updates. Other distributions for modeling person sizes can be applied, such as uniform, Chi-square, student-distribution, Poisson, etc. In addition to the parametric probability distributions, non-parametric distributions could also be used. One example is the kernel density estimation (KDE). Similarly, various range filters could be applied to any of the chosen distributions. After the updating part of the training process is finished, the system obtains a parameter map for the camera FOV, which associate a unique set of parameters to each block. The size range of single persons of each image block is defined in terms of the corresponding distribution mean and standard deviation, as previously described.

During training mode, it is possible that only some image blocks may acquire enough training samples to generate meaningful parameters. Other image blocks may have only captured a few people passing through, such that they could not generate meaningful person size parameters 34. Image blocks with sufficient training samples are called "active blocks", and the ones with insufficient training samples are called "idle blocks". In the operational counting mode, it is possible that people may pass through the idle blocks. To address this, the parameters of the idle blocks are interpolated using information from the active blocks. This interpolation process is implemented by parameter propagation system 32, and is referred to herein as "parameter propagation."

Figure 2:
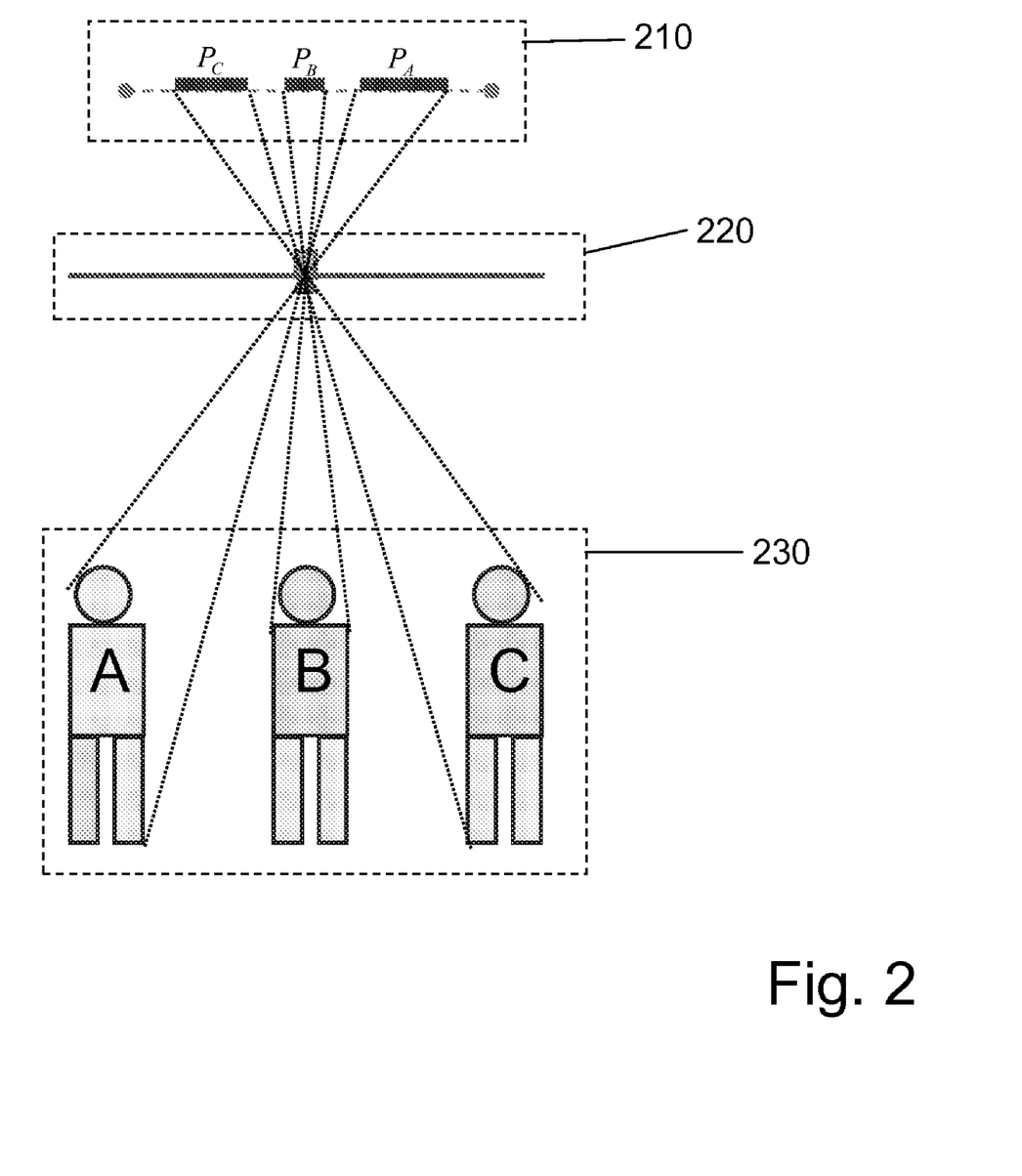
FIG. 2 depicts an illustration of camera perspective projection effects.

There are two options for parameter propagation: one is to use each obtained training sample to update all the image blocks during training, and the other is to use each sample only updating its corresponding blocks and perform interpolation for the idle blocks after all the training samples are collected. For both propagation models, the underlying assumption is that the image center coincides with the camera principal point. This means that the same person will look the smallest in the center of the camera FOV, and gradually becomes larger moving towards to the image edges (e.g., as shown in FIG. 2). The camera principal point can also be automatically detected using more sophisticated camera calibration techniques.

Figure 4:
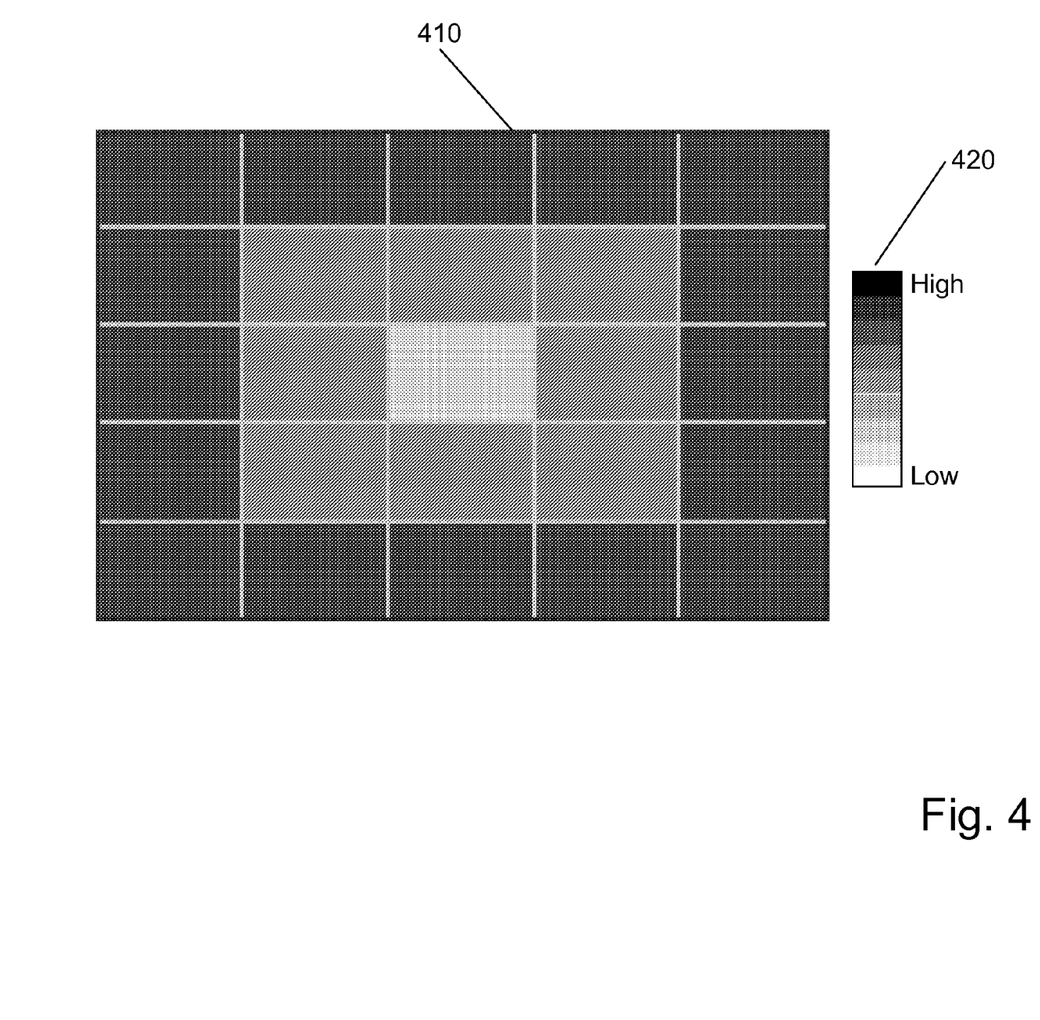
FIG. 4 shows a distance map of image blocks in accordance with an embodiment of the invention.

In the first propagation model, after a new person size is obtained for block (i,j), interpolated person sizes are generated for all the other image blocks, and parameters of all image blocks are updated accordingly. The interpolated sizes are proportional to the distances of image blocks to the image center (the camera principal center). One example distance map of the image blocks is shown in FIG. 4, in which each block is mapped to a distance scale 420 and blocks farther away from the center have a higher proportional size. The value of each block 410 may be computed as the farthest distance from all the pixels of the block to the image center.

For a new image block (m,n), its new person size is linearly interpolated from the real sample obtained from block (i,j). Different from the previous described updating scheme, which assumes equal weights for all the training samples, a newly interpolated size for image block (m,n) may be assigned with a confidence weight to update the person size parameters 34. The confidence weight is determined by the distance between blocks (m,n) and (i,j). The farther block (m,n) departs away from block (i,j), the lower the interpolation confidence weight is. An inverse-linear function may be used to compute the interpolation confidence. Other meaningful measures could also be applied, such as Manhattan distance, Gaussian model, exponential function, Poisson function, and etc.

One potential limitation of the first parameter propagation model is that noises and errors obtained from each training round are kept and accumulate throughout the entire training process. Therefore, the final person size range may not be accurate for counting purposes. To overcome this error accumulation limitation, a second parameter propagation model may be utilized, which interpolates the size parameters of the idle image blocks after all the real training samples are obtained for the active blocks. During the training process, the size parameters of the active blocks (the blocks with sufficient real training samples) are updated in the normal way using only true samples, as described earlier. The parameters of the idle blocks are interpolated using information of all the active blocks. The final mean of the person sizes for idle block i, $\mu_i$, is a linear combination of all the interpolated sizes from the active block parameters, such that $$\mu_i = \sum_j w^i_j s^i_j,$$

where j∈all active blocks, $s^i_j$ is the projected size from active block j and $w^i_j$ is the confidence weight of $s^i_j$. The confidence weights are normalized such that $\Sigma w_j = 1$. The standard deviations of the idle blocks are interpolated in a similar fashion.

One illustration of the second parameter propagation model is shown in FIG. 5. In this illustration, shaded areas 510 represent the active blocks, and blank ones are the idle blocks. The parameters of the target block, T, are interpolated using parameters obtained from all five active blocks. The arrows are accompanied with the corresponding normalized interpolation confidence weights.

Once the training process is finished, a parameter map is generated for the environment where the person counting system 18 is deployed. As noted, the person size range information of each image block may be specified in terms of the size mean and the standard deviation of that block. In the operational counting mode, once the person/people motion blob satisfies the counting criteria (e.g., blob in the counting region and crossed the traffic line), the number of persons in the target blob can be determined using the person size parameters 34 of the corresponding image block.

The person size parameters 34 can also be learned in an online fashion, in which case the parameters are updated while the counting is in progress. In the online update model, motion blobs are used to count the number of passing people. They are further used as the training samples to update the person size parameters 34 for subsequent counting. A history-aware weighting technique can be incorporated in the online updating model, such that the most recent training samples are assigned with more significant weights than previous obtained samples. This could be considered as the person counting system 18 keeps a memory about the history of the training samples. The online weighting model could be any reasonable time-related probability distributions, e.g., a Poisson distribution. Another simplification of weight assignment is to use a fixed weight for the most recent training samples, such that these samples overwhelm previous ones. To reduce the errors caused by noise, range filters can be applied to accept or reject the online training samples.

The present invention is not limited to the learning of size range parameters for single persons, but instead can also be generalized and applied to learn the size information of multiple people in groups, which is often the case when people are walking closely side-by-side and causing a single motion block in the camera field-of-view. This is particularly useful in the online update embodiment of the proposed invention. In this situation, distinction rules are used to separate the distributions of sizes for different numbers of persons. One way of determining the separation boundaries is by detecting the "modes" (local maxima) and the "valleys" (local minima) in the motion blob size distribution of all numbers of persons.

Figure 6:
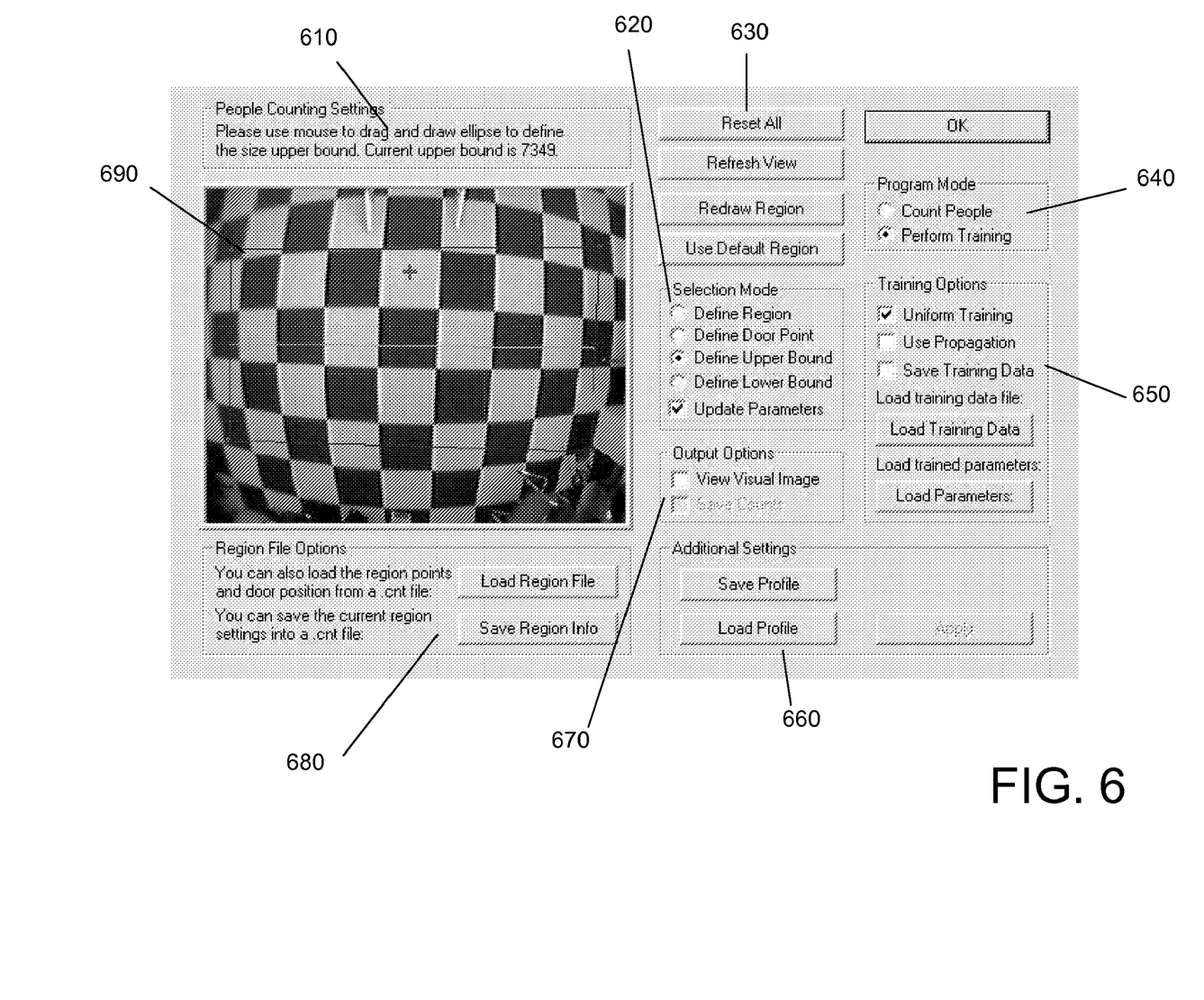
FIG. 6 shows the graphical user interface of the automatic training settings for the people counting system in accordance with an embodiment of the invention.

FIG. 6 shows an illustrative user interface 610 for implementing person counting system 18 (FIG. 1). Interface 610 includes an image area 690 for displaying the FOV, buttons 620 for selecting different definition modes, reset/refresh buttons 630, buttons 640 for selecting between count and training modes, buttons 650 for selecting training options, buttons 680 for loading and saving region data, buttons 670 for selecting different output options and buttons 660 saving and loading profiles.

Figure 7:
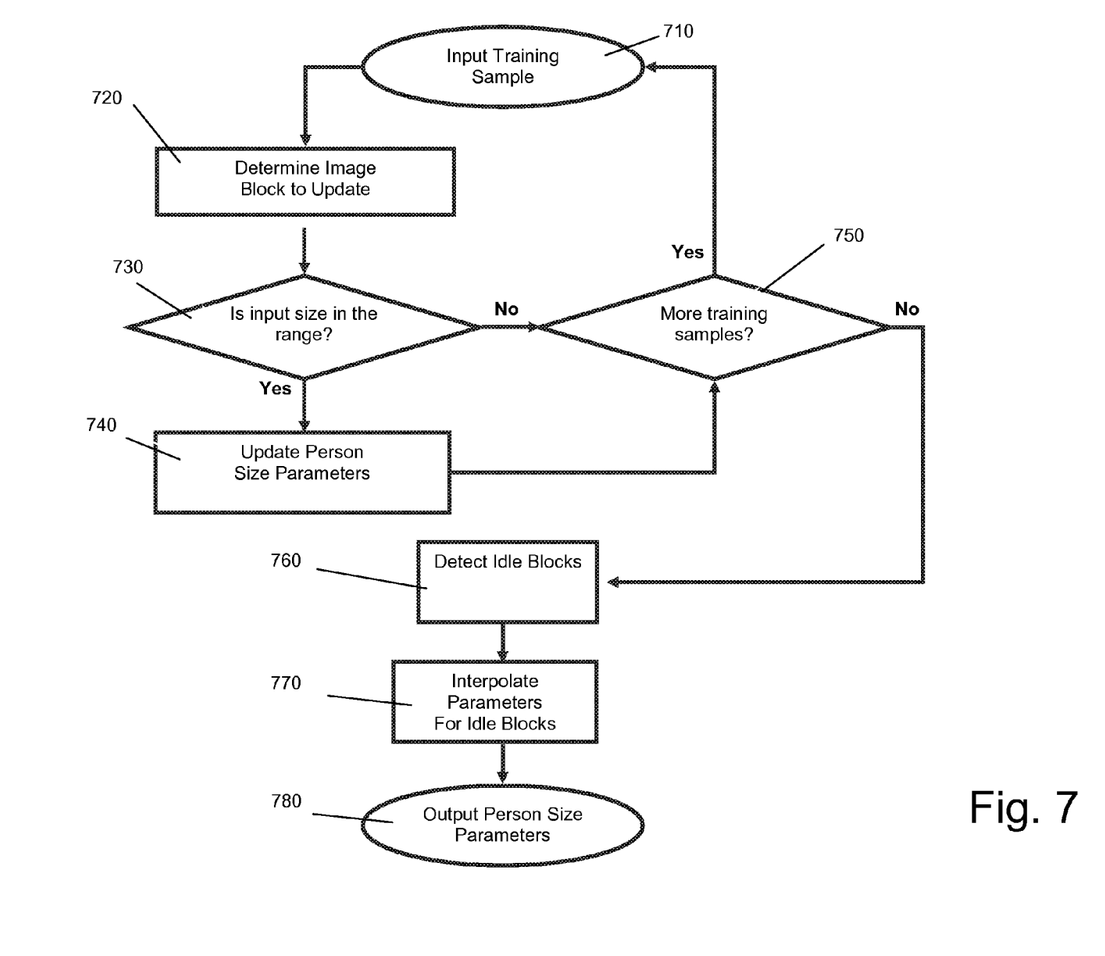
FIG. 7 depicts a flowchart of a process in accordance with the present invention.

FIG. 7 shows a flowchart of a process of the present invention, including different components of the framework. Elliptical blocks represent the input and output of the system. Rectangular blocks represent the components of the system, and the diamond-shape blocks represent the conditionals (or decisions). First, a training sample is inputted 710, and a determination is made of which image block is to be updated 720, i.e., which block does the image appear in. Next, a determination is made whether the input size falls within a predetermined range 730. If yes, then the person size parameters for the block are updated 740. Next, a determination is made whether more training samples are needed 750. If yes, then a next sample is inputted 710. If no, then idle blocks are detected 760 and parameters are interpolated for the idle blocks 770. Finally, person size parameters are output 780.

Referring again to FIG. 1, it is understood that computer system 10 may be implemented as any type of computing infrastructure. Computer system 10 generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 17 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Access to computer system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system 10 comprising a video surveillance system 11 could be created, maintained and/or deployed by a service provider that offers the functions described herein for customers. That is, a service provider could offer to deploy or provide the ability to provide a person counting system 18 as described above.

It is understood that in addition to being implemented as a system and method, the features may be provided as a program product stored on a computer-readable medium, which when executed, enables computer system 10 to provide a person counting system 18. To this extent, the computer-readable medium may include program code, which implements the processes and systems described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 16 and/or a storage system, and/or as a data signal traveling over a network (e.g., during a wired/wireless electronic distribution of the program product).

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that terms such as "component" and "system" are synonymous as used herein and represent any combination of hardware and/or software capable of performing some function(s).

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams can be implemented by special purpose hardware-based systems which perform the specified functions or acts, or combinations of special purpose hardware and computer instructions.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A system for processing captured image data, comprising:
   a computer system for counting people in the image data of a deployed environment by performing a method comprising:
      dividing a field of view (FOV) of the captured image data into a plurality of blocks; and
      learning person size parameters for each block of the field of view for the deployed environment during a training mode, wherein the training mode is performed using image data for the deployed environment, wherein the learning includes:
         independently calculating the person size parameters for a set of active blocks in the plurality of blocks using a plurality of blobs appearing in each active block; and
         interpolating the person size parameters for a set of idle blocks in the plurality of blocks using the person size parameters for at least one of the set of active blocks.

2. The system of claim 1, the method further comprising counting persons passing through the FOV for the deployed environment during an operational mode by comparing a blob size appearing in a block with the person size parameters for the block and outputting count data, wherein the operational mode occurs after the training mode.

3. The system of claim 1, wherein the set of blocks form a grid of rectangles.

4. The system of claim 1, the method further comprising refining the blob prior to the updating.

5. The system of claim 1, wherein the interpolating is performed at the end of the training mode.

6. The system of claim 5, wherein the interpolating utilizes confidence weighting based on a distance between the at least one of the set of active blocks and the idle block.

7. The system of claim 1, wherein the learning updates the person size parameters for each block using a Gaussian distribution.

8. A non-transitory computer readable medium for storing a program product, the program product including program code, which when executed by a computer system, enables the computer system to implement a method comprising:
  dividing a field of view (FOV) of captured image data into a plurality of blocks; and
  learning person size parameters for each block of the field of view for the deployed environment during a training mode, wherein the training mode is performed using image data for the deployed environment, wherein the learning includes:
    independently calculating the person size parameters for a set of active blocks in the plurality of blocks using a plurality of blobs appearing in each active block; and
    interpolating the person size parameters for a set of idle blocks in the plurality of blocks using the person size parameters for at least one of the set of active blocks.

9. The program product of claim 8, the method further comprising counting persons passing through the FOV for the deployed environment during an operational mode by comparing a blob size appearing in a block with the person size parameters for the block and outputting count data, wherein the operational mode occurs after the training mode.

10. The program product of claim 8, wherein the set of blocks form a grid of rectangles.

11. The program product of claim 8, the method further comprising refining the blob prior to the updating.

12. The program product of claim 8, wherein the interpolating is performed at the end of the training mode.

13. The program product of claim 12, wherein the interpolating utilizes confidence weighting based on a distance between the at least one of the set of active blocks and the idle block.

14. The program product of claim 8, wherein the learning updates the person size parameters for each block using a Gaussian distribution.

15. A method for implementing a person counting system, comprising:
  dividing a field of view (FOV) of captured image data into a plurality of blocks; and
  learning person size parameters for each block of the field of view for the deployed environment during a training mode, wherein the training mode is performed using image data for the deployed environment, wherein the learning includes:
    independently calculating the person size parameters for a set of active blocks in the plurality of blocks using a plurality of blobs appearing in each active block; and
    interpolating the person size parameters for a set of idle blocks in the plurality of blocks using the person size parameters for at least one of the set of active blocks.

16. The method of claim 15, further comprising:
  counting persons passing through the FOV for the deployed environment during an operational mode by comparing a blob size appearing in a block with the person size parameters for the block, wherein the operational mode occurs after the training mode.

17. The method of claim 15, wherein the set of blocks form a grid of rectangles.

18. The method of claim 15, the method further comprising refining the blob prior to the updating.

19. The method of claim 15, wherein the interpolating is performed at the end of the training mode.

20. The method of claim 19, wherein the interpolating utilizes confidence weighting based on a distance between the at least one of the set of active blocks and the idle block.

21. The method of claim 15, wherein the learning updates the person size parameters for each block using a Gaussian distribution.

22. A method for deploying a system for counting persons from a captured image data, comprising:
  providing a computer infrastructure for:
    dividing a field of view (FOV) of the captured image data into a plurality of blocks;
    learning person size parameters for each block of the field of view for the deployed environment during a training mode, wherein the training mode is performed using image data for the deployed environment, wherein the learning includes:
      independently calculating the person size parameters for a set of active blocks in the plurality of blocks using a plurality of blobs appearing in each active block; and
      interpolating the person size parameters for a set of idle blocks in the plurality of blocks using the person size parameters for at least one of the set of active blocks;
    counting persons passing through the FOV for the deployed environment during an operational mode by comparing a blob size appearing in a block with the person size parameters for the block; and
    outputting count data during the operational mode, wherein the operational mode occurs after the training mode.

* * * * *